United States Patent [19]

May

[11] 4,000,722
[45] Jan. 4, 1977

[54] EXTERNALLY IGNITED FOUR CYCLE INTERNAL COMBUSTION ENGINE

[76] Inventor: Michael G. May, Bel Air, CH-1180 Rolle, Switzerland

[22] Filed: Jan. 29, 1975

[21] Appl. No.: 545,023

[30] Foreign Application Priority Data

Jan. 30, 1974 Germany .......................... 2404395

[52] U.S. Cl. .......................... 123/30 D; 123/32 C; 123/32 SP; 123/191 S
[51] Int. Cl.² ........................................... F02B 3/00
[58] Field of Search ............ 123/30 D, 32 C, 32 D, 123/32 SP, 32 ST, 188 M, 191 S, 191 SP, 191 M, DIG. 4

[56] References Cited

UNITED STATES PATENTS

| | | | |
|---|---|---|---|
| 1,689,304 | 10/1928 | Smith | 123/191 SP |
| 1,993,179 | 3/1935 | Nibbs | 123/32 C |
| 1,998,708 | 4/1935 | Cambell | 123/32 SP |
| 2,746,433 | 5/1956 | Nallinger | 123/32 C |
| 2,760,478 | 8/1956 | Boghetto | 123/191 M |
| 2,763,254 | 9/1956 | Klug | 123/191 M |
| 2,986,129 | 5/1961 | Henry-Biaband | 123/191 M |

*Primary Examiner*—Wendell E. Burns
*Assistant Examiner*—David D. Reynolds
*Attorney, Agent, or Firm*—Edwin E. Greigg

[57] ABSTRACT

An externally ignited four cycle internal combustion engine equipped with an inlet valve and an outlet valve. A swirl (turbulence or vortex) chamber is provided within the cylinder head, the height of the swirl chamber being less than its maximum diameter. An outlet closable by the outlet valve is located in the upper portion of the swirl chamber. A channel-like recess, which creates a guide channel when the piston is in its top dead center position, terminates approximately tangentially in the swirl chamber. The channel-like recess may be formed in the cylinder head, in the top of the piston or partially in both of these members.

17 Claims, 4 Drawing Figures

EXTERNALLY IGNITED FOUR CYCLE INTERNAL COMBUSTION ENGINE

BACKGROUND OF THE INVENTION

This invention relates to an externally ignited four cycle internal combustion engine in which the fuel-air mixture is formed outside of at least one cylinder. The present invention is concerned, more particularly, with such an internal combustion engine in which the cylinder head of each cylinder is equipped with one inlet valve and one outlet valve. The outlet to be closed by the outlet valve is located in the proper portion of a swirl (turbulence or vortex) chamber within this cylinder, which is open in the direction of the interior volume of the cylinder below the cylinder head. The height of the swirl chamber is typically less than its maximum diameter.

Numerous engines with swirl chambers are known. Until the present time, the fuel for these engines had always been injected directly into the swirl chamber. In the short time available, the fuel can be mixed with the air substantially better when the fuel is injected directly into or from a swirl chamber. However, direct fuel injection requires expensive injection pumps and hence is limited to special cases in which the extra costs appear to be justified. There have also been many instances of swirl chambers used with direct fuel injection into the swirl chamber for the purpose of creating a stratified charge immediately prior to the ignition with the goal of achieving cleaner combustion.

The possibility of supplying these constructionally simple engines with a fuel/air mixture prepared outside of the cylinder has previously been part of the state of the art on paper only because no advantages could heretofore be achieved by comparison with internal combustion engines without swirl chambers.

OBJECT AND SUMMARY OF THE INVENION

It is a principal object of the invention to provide an engine of the type described above, i.e. an engine with only one inlet valve and one outlet valve per cylinder, which is so improved that it has clear advantages by comparison with engines without swirl (turbulence or vortex) chambers especially in having a high thermodynamic efficiency with all the advantages deriving therefrom and a high degree of completeness of combustion, so that, among other things, this engine also expels only a relatively small amount of toxic exhaust gas constituents.

Thus, according to the invention, it is provided in an engine of the type described above that the cylinder head and/or the top of the piston includes a channel-like recess which becomes a guide channel for the gases when the piston is in its top dead center position. The guide channel terminates approximately tangentially in the swirl chamber and is defined by the cylinder head and the top of the piston. The height and cross-section of the guide channel both increase from the vicinity of the inlet valve in the direction to the swirl chamber. The guide channel is so disposed that it creates a rotational gas flow in the swirl chamber whose axis is coaxial with the longitudinal axis of the outlet valve. The rotational gas flow takes place at the latest near the end of the compression stroke of the piston.

The guide channel and the swirl chamber are preferably so embodied that the axis of rotation of rotational gas flow is approximately coaxial with the longitudinal axis of the outlet valve.

The channel-like recess in the cylinder head and/or the piston considerably facilitates the influx of fuel-air mixture into the swirl chamber and is so embodied that only a single rotational flow is generated within the swirl chamber and its rotational axis is approximately coaxial with the outlet valve. The rotational flow leads to rapid combustion and low streaming losses during the compression stroke and during the expulsion of the combusted mixture. Furthermore, the engine may be operated with a surprisingly lean fuel-air mixture. In addition, the fluctuation of the pressure characteristics of consecutive cycles is small in steady state operation. The engine, according to the invention, has low fuel consumption, high specific power and exhibits clean combustion with relatively small amounts of toxic constituents present in the exhaust gas. In addition, the engine tends not to "ping" so that it may be operated at relatively high compression ratios using ordinary fuels. Nevertheless, the engine is inexpensive to manufacture because it does not employ direct fuel injection and it can be embodied with only one inlet valve and one outlet valve for each cylinder. Furthermore, the mass production facilities for four cycle, internal combustion engines without swirl chambers can be readily changed over to the manufacture of internal combustion engines according to the invention at relatively low cost since, in the simplest case, only the outlet valve and the cylinder head need to be altered.

A preferred exemplary embodiment provides that the guide channel extends approximately in the direction of rotation of the gas mixture within the cylinder, and that its height increases in the same direction. This characteristic advantageously reduces the flow losses.

It is known that flat-head pistons, or pistons having only slightly bulging heads favorably have a minimum heat transfer area. Therefore, it can be suitably provided that the piston used is a flat-head piston or a piston with an only slightly bulging head and that the channel-like recess is provided only in the cylinder head. In addition, this embodiment produces particularly low flow losses.

In order to further improve, i. e. to accelerate the combustion process, it may be suitably provided that, when the piston is in its top dead center position, then preferably at least 80 percent of the remaining volume of the combustion chamber is formed by the swirl chamber and by the guide channel.

In many cases, the swirl chamber may suitably be approximately rotationally symmetric in known manner. In a preferred further embodiment, which differs from this known construction, the walls of the swirl chamber have a spiral form and the distance of the walls from the longitudinal axis of the outlet valve diminishes when going in the direction of rotation of the rotational gas flow generated within it toward the rupture edge of the terminus of the guide channel. It has been shown that this construction generally further improves the operational characteristics of the engine, especially when extremely lean mixtures are being used.

In general, it is suitable to provide that the lowest edge of the turbulence or vortex chamber lies at least substantially and preferably completely within the geometric cylinder defined by the path taken by the piston. This condition particularly contributes to small flow and expulsion losses. Furthermore, it minimizes the surface areas of the combustion chamber which is also favorable.

For reasons of flow dynamics as well as for simplicity of assembly of the outlet valve, it may be suitably provided that the orifice of the swirl chamber facing the piston is smaller than its maximum cross-section, but is larger than the diameter of the disc of the outlet valve.

It is also generally suitable, according to the invention, to provide that the height of the swirl chamber is less than its maximum diameter. It is especially advantageous if the height of the swirl chamber is smaller than its maximum radius.

In general, the fuel mixtures which may be used in the engine can be further leaned out by providing that the wall of the swirl chamber is at least partially uncooled and preferably along its entire circumference in such a way that the wall acquires temperatures in the range of from at least 300° C to at most 500° to 600° C during partial and full-load operation.

One may achieve minimum expulsion losses by providing that when the outlet valve is in the fully opened position, the bottom of the disc of the outlet valve is approximately at the level of the largest diameter of the swirl chamber.

The invention will be better understood, as well as further objects and advantages thereof will become more apparent, from the ensuing detailed description of an exemplary embodiment taken in conjunction with the accompanying drawing figures.

DESCRIPTION OF THE PREFERRED EMBODIMENT

Figure 1:
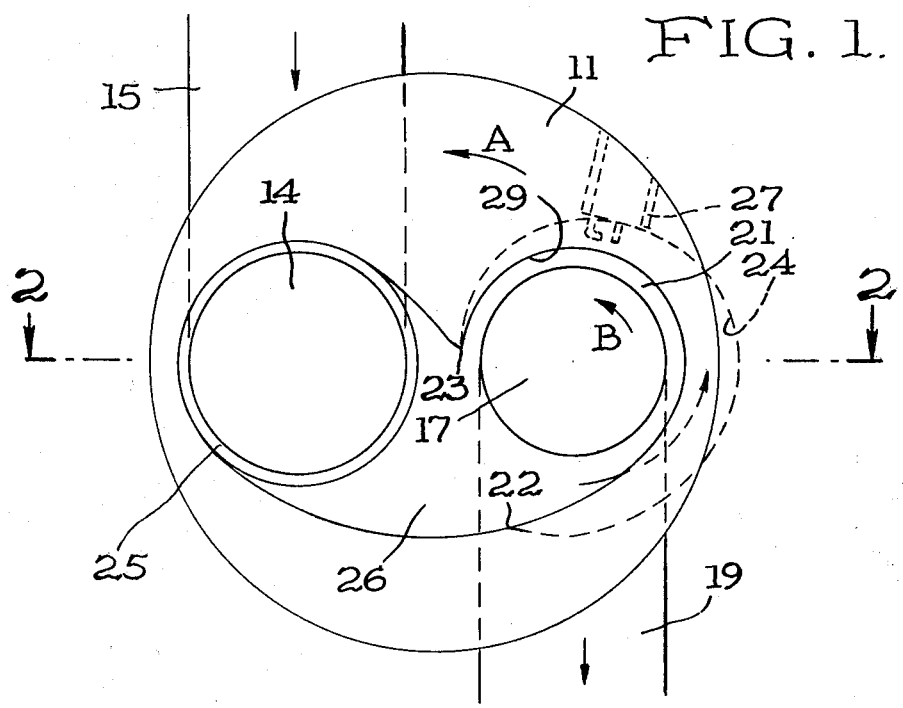
FIG. 1 is a partial sectional, bottom view of the cylinder head of a four-cycle internal combustion engine according to the invention, provision for one cylinder being shown; it is to be understood that the engine may have additional cylinders.
Figure 2:
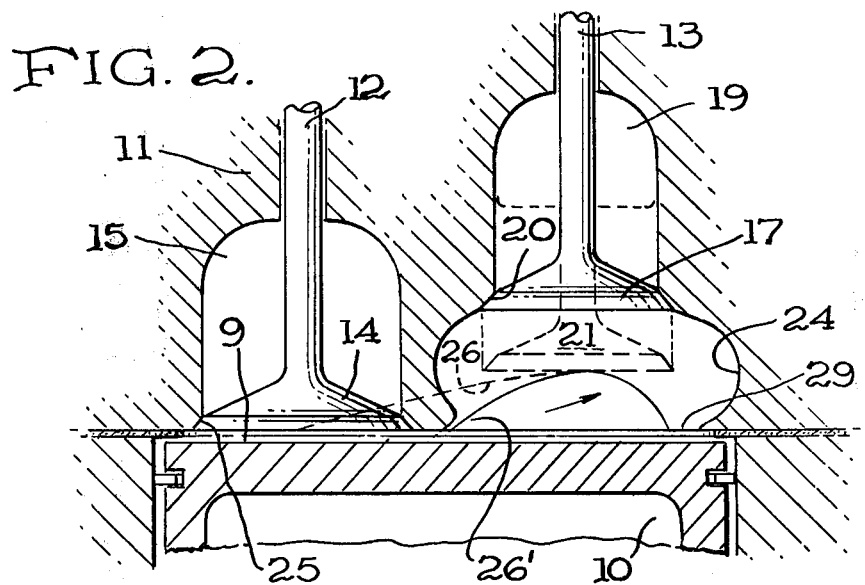
FIG. 2 is a cross-sectional view of the cylinder head of FIG. 1, the section being taken along the line 2—2, this figure also showing a portion of the cylinder wall and a portion of the piston.

According to FIG. 2, in this preferred exemplary embodiment, a piston 10 is embodied as a flat-head piston, i. e. it has a flat piston-head 9. A cylinder head 11 includes an inlet valve 12 and an outlet valve 13. A portion of an induction tube 15 leading to the space above a valve disc 14 of the inlet valve 12 extends approximately perpendicular to the longitudinal axis of the inlet valve 12, as may be seen in FIG. 1, during the intake stroke of the piston 10, the gas flowing into the combustion chamber preferably has the direction of the arrowhead line A, i. e. it rotates within the cylinder volume and below the cylinder head 11 in the direction of the arrowheaded line A. An exhaust line 19 is in fluid communication with the space above a valve disc 17 of the outlet valve 13 and extends approximately parallel to that portion of the induction tube 15 which is in fluid communication with the space above the disc 14 of the inlet valve 12.

An outlet aperture 20 associated with the outlet valve disc 17 is disposed in the top of a swirl (turbulence or vortex) chamber 21. The plane of this outlet aperture 20 is suitably approximately parallel to the top 9 of the piston 10. A circumferential wall 24 of the swirl chamber 21 is approximately semi-circular in cross-section, the radius of this semi-circular cross-section being substantially smaller than the maximum diameter of the swirl chamber 21 so that the swirl chamber 21 has approximately the shape of an oblate sphere. It is preferably provided, however, that the swirl chamber 21 is not an exactly flattened-out sphere, but that the distance of the circumferential wall 24 of the swirl chamber 21 from the central axis of the swirl chamber 21, which is coaxial with the longitudinal axis of the outlet valve 13, gets uniformly smaller in the circumferential direction from a location 22 up to a location 23 so that this circumferential wall 24 runs approximately spirally in the circumferential direction of the swirl chamber 21.

It may be seen especially clearly from FIG. 1 that, extending from a cylinder inlet aperture 25, which may be closed off by the inlet valve 12, is a channel-like recess or cavity 26 which, in the exemplary embodiment, is worked into the inwardly facing surface of the cylinder head 11 adjacent to and facing the top of the piston 9 and which extends up to the swirl chamber 21 and whose height, as can be seen in FIG. 2, continually increases from the inlet aperture 25 up to the swirl chamber 21.

In the top dead center position of the piston 10, as shown in FIG. 2, this channel-like recess or cavity 26, together with the top of the piston 9, forms a guide channel 26' which, as may be clearly seen in FIG. 1, terminates approximately tangentially in the circumferential wall 24 of the swirl chamber 21. The guide channel 26' can be considered to provide fluid communication from a first chamber constituted by space surrounding the face of the disc 14 of the inlet valve 12 to a second chamber constituted by space surrounding the face of the disc 17 of the outlet valve 13. The volume of the second chamber is at least ten times as large as the volume of the first chamber.

The cross-section of the guide channel 26' also continually increases from the inlet valve 12 up to the swirl chamber 21 due to its continuously increasing height. Its width is substantially constant throughout it length. The terminus of the channel-like recess or cavity 26 nearest the swirl chamber 21 extends up to nearly half the height of the swirl chamber 21.

The side of the channel-like recess or cavity 26 adjacent to the longitudinal axis of the cylinder terminates at the circumferential wall 24 of the swirl chamber 21 in the location 23, in the manner of a break-away edge so that the fluid flow entering the swirl chamber 21 out of this channel-like recess or cavity 26 during the compression stroke will break away. The other side of the channel-like recess or cavity 26 continuously extends into the circumferential wall 24 of the swirl chamber 21 at the location 22.

As may be seen in FIG. 1, the channel-like recess or cavity 26 is arch-shaped and curved and extends in the direction of the rotational fluid flow generated in the cylinder during the suction stroke, as diagrammatically illustrated by the arrowheaded line A. This can also be described by saying that, in the view shown in FIG. 1, this channel-like recess or cavity 26 starts at that side of the inlet aperture 25 farthest from the shown section of the induction tube 15 and it does so not diametrically opposite this induction tube section, but shifted angularly somewhat in the direction of the swirl chamber 21. This results in a relatively short length of the guide channel 26' which is favorable.

As may be seen in FIG. 2, the combustion chamber volume remaining when the piston 10 is in its top dead center position is determined substantially only by the guide channel 26' and the swirl chamber 21.

As has been suggested by broken lines, in the fully open position of the outlet valve 13, the outlet valve disc 17 lies at approximately the level of the largest diameter of the swirl chamber 21, i. e. as shown here, approximately at half the height of the swirl chamber 21, this disposition being generally advantageous.

Suitably, as may be seen in FIG. 2, a spark plug 27 is inserted in the circumferential wall 24 of the swirl chamber 21.

The volume of the channel-like recess or cavity 26 is smaller, and preferably substantially smaller than the volume of the swirl chamber 21.

The swirl chamber 21 is the only swirl chamber of the cylinder and the inlet aperture 25 is located a small distance above the top of the piston 9 when this piston is in its top dead center position. This improves the expulsion of combusted gases, among other things.

It may further be seen from the drawing figures that the entire lower edge of the lower, relatively large, swirl chamber opening 29, which is interrupted only by the terminus of the channel-like recess or cavity 26, lies opposite the top 9 of the piston 10, so that the flow passage cross-section from the cylinder volume region, defined by the path of the piston 10 into the swirl chamber 21, is not narrowed by the circumference of the cylinder wall defining the path of the piston 10 and this is especially favorable.

Except for the swirl chamber 21 and the channel-like recess or cavity 26, the remaining region of the cylinder head 11 is so close to the piston 10 in the dead center position of the latter, that a so-called compression zone or squeezing zone is formed in this entire remaining region.

In addition, the swirl chamber 21 begins practically immediately at the lower edge of its opening 29 adjacent to the top 9 of the piston 10 so that, in practice, it is immediately adjacent to the cylinder volume beneath the cylinder head 11.

The following text sets forth the method of operation of the sectionally illustrated cylinder forming part of an externally ignited four-cycle internal combustion engine, not shown in further detail and whose fuel-air mixture is produced in any known manner outside of the combustion chamber of the cylinder, for example by means of a carburetor or by fuel injection into an induction tube.

During the suction stroke, and in known manner, the downward motion of the piston 10 aspirates a fuel-air mixture into the combustion chamber while the inlet valve 12 is open. The mixture may swirl within the interior cylindrical volume in the direction of the arrowhead line A, at least for larger amounts of gaseous mixture. During the subsequent compression motion of the piston 10, this mixture is compressed and a slow rotational flow in the direction of an arrowheaded line B may already be formed at this time in the swirl chamber 21 conditioned by the channel-like recess or cavity 26. The rotational axis of this flow is approximately coaxial with the longitudinal axis of the outlet valve 13. Toward the end of the compressional motion of the piston 10, the top 9 of the piston 10 comes closer and closer to the channel-like recess or cavity 26 so that the flow occurring therein is reinforced and a relatively intensive flow of fuel-air mixture takes place, via the guide channel 26' being formed, into the swirl chamber 21, where it generates an intensive rotational flow in the direction of the arrowheaded line B. The spark plug 27 ignites the fuel-air mixture in known manner at adjustable crank shaft angles during the compressional motion of the piston 10, i. e. before the piston 10 has reached its top dead center position.

Due to the concentration of the mixture in the swirl chamber 21 and in the guide channel 26' and due to the intensive and orderly rotational flow prevailing in the same sense in the swirl chamber 21, the combustion process is rapid and a high degree of fuel utilization is achieved. After the piston 10 has passed its top dead center position, it is pushed downwardly and during the next upward motion of the piston 10 and while the outlet valve 13 is open, the combusted gas is expelled through the swirl chamber 21 into the exhaust line 19 and in this process the channel-like recess or cavity 26 also improves the expulsion of the combusted gases.

An engine constructed as described above may be operated with very lean fuel-air mixtures, exhibits a low specific fuel consumption and the exhaust gas contains relatively few toxic constituents, so that in spite of its simple construction and its relatively high specific power, it is compatible with the environment. In addition the octane number of the fuel may be relatively low.

Figure 3:
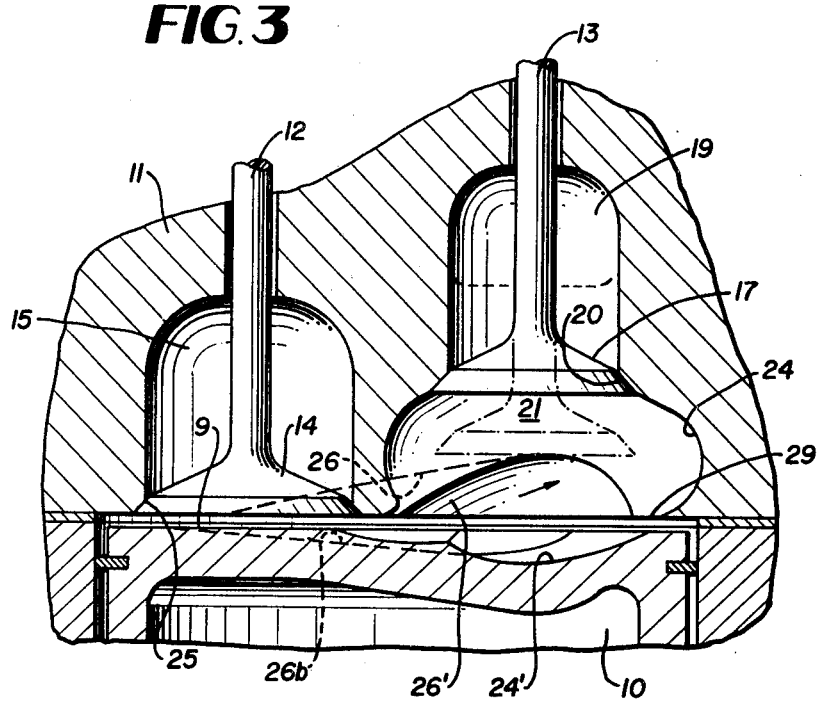
FIG. 3 is a cross-sectional view of a cylinder head and piston in a variant embodiment.
Figure 4:
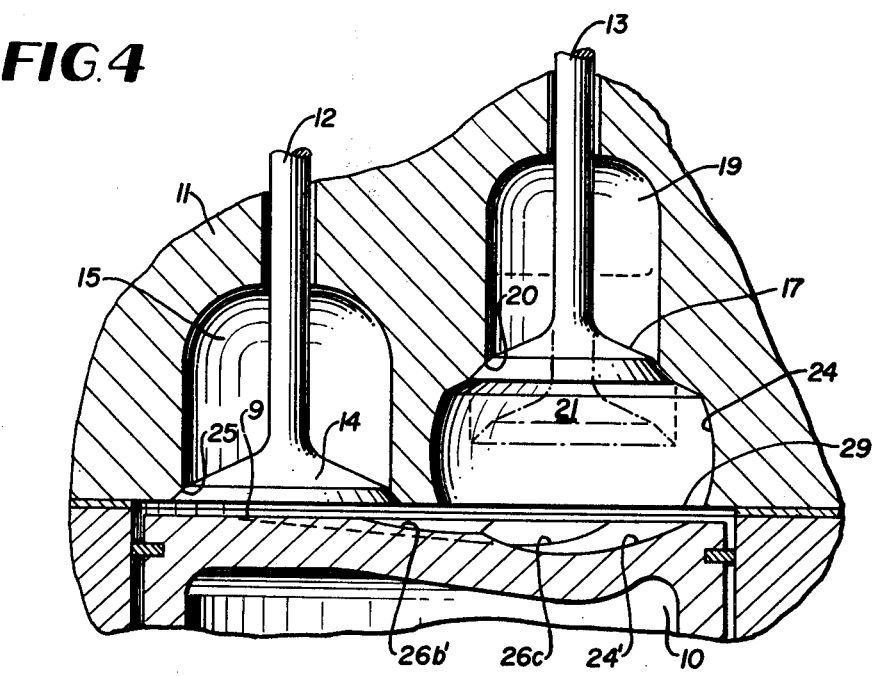
FIG. 4 is a cross-sectional view of a cylinder head and piston in a further variant embodiment.

As preferably provided in the exemplary embodiment, the channel-like recess or cavity 26 is located only in the cylinder head. However, in many cases, it may be suitable to form the guide channel 26' by opposite cavities in the cylinder head 11 and the top 9 of the piston 10, and it ought to be generally suitable to make the depth of the cavity in the cylinder head 11 greater than the depth of the cavity in the top 9 of the piston 10. This variant is illustrated in FIG. 3 which shows cavities 26b and 24' in the top of the piston. In special cases, it is also conceivable that the guide channel 26' may be formed exclusively by a depression or cavity in the top 9 of the piston 10 which is so shaped that toward the end of the compression stroke of the piston 10, it introduces gas into the swirl chamber 21 tangentially so that the gas executes a rotational flow along the circumferential wall 24 of the swirl chamber 21 or that at least a substantial component of this rotational flow lies along the circumferential direction of the swirl chamber 21. This variant is illustrated in FIG. 4.

It is also conceivable to provide, for example, a spherical indentation or depression 24' in the top 9 of the piston 10 opposite the swirl chamber 21 and the cylinder head 11 where this depression extends the swirl chamber 21 down into the top 9 of the piston 10 when the piston 10 is in its top dead center position, but where the depth of this depression in the top 9 of the piston 10 can be suitably substantially smaller than the height of the swirl chamber 21 in the cylinder head 11 so as to limit the thermal loading of the top 9 of the piston 10. The piston may have further connecting cavities 26c and 26b' which, together with the cavity 24' form the guide channel 26' at TDC.

It is to be appreciated that the exemplary embodiments of the present invention illustrated and described in detail, and the variants mentioned have been set out by way of example and not by way of limitation. Numerous other embodiments and variants are possible within the spirit and scope of the present invention, the scope being defined by the appended claims.

What is claimed is:

1. A four-cycle, externally ignited internal combustion engine comprising:
cylinder means;
cylinder head means attached to said cylinder means;
a piston moving reciprocatingly within said cylinder, thereby defining a combustion chamber of varying geometry;
an overhead intake valve for closing an inlet opening having a valve seat and which admits a substantially homogeneous combustible charge and is the only inlet means for said engine;
a chamber in said cylinder head extending said combustion chamber into said cylinder head, said chamber having a depth of penetration into said cylinder head which is less than the lateral extent of said chamber and said chamber having continuous curved walls defining the lateral extent thereof;
an overhead exhaust valve whose valve disc defines the vertical extent of said chamber in said cylinder head and whose valve seat lies in a plane which is displaced from the plane which includes the seat of said inlet valve;
and said piston and said cylinder head are disposed to cooperate so that, at top dead center of said piston, said piston head and said inlet valve disc are substantially parallel and so near each other that, during the end of the compression stroke, the top of said piston and said cylinder head cooperate to define a guide channel originating in the vicinity of said inlet valve disc and leading to said chamber and terminating in said chamber in a substantially tangential manner; whereby gaseous charge is accelerated through said guide channel to thereby enter said chamber substantially tangentially and induce therein a substantially unique vortex flow whose axis of rotation is substantially parallel to the longitudinal cylinder axis;
said piston and said cylinder head further cooperating in such a manner that, at top dead center, the combustible charge is substantially confined to said chamber and to said guide channel only.

2. An internal combustion engine as defined by claim 1 including means for establishing a rotating motion of the fuel-air mixture in the cylinder in a given direction of rotation about the axis of the cylinder and wherein said guide channel extends approximately in said given direction of rotation of the fuel-air mixture in said cylinder.

3. An internal combustion engine as defined by claim 1 wherein said guide channel includes two substantially parallel side walls and wherein one only of said two side walls has a cusp-like inward projection; whereby the flow of gaseous charge through said guide channel is disturbed on one side thereof.

4. An internal combustion engine as defined by claim 1, wherein the center of said exhaust valve seat lies in one transverse cylinder plane and the center of said inlet valve seat lies in another transverse cylinder plane and wherein the axial separation of said first and second transverse planes is substantially equal to the height of said chamber.

5. An internal combustion engine according to claim 1, wherein said guide channel is partially formed in said cylinder head and partially on the top of said piston.

6. An internal combustion engine according to claim 1, wherein said guide channel is formed substantially in said cylinder head.

7. An internal combustion engine according to claim 1, wherein said guide channel is formed substantially in the top of said piston.

8. An internal combustion engine according to claim 1, wherein said piston is a substantially flat-headed piston and said guide channel is formed only in said cylinder head.

9. An internal combustion engine according to claim 1, wherein the combustion volume remaining when said piston is in its top dead center position is formed substantially at least by 80 percent by said chamber and by said guide channel.

10. An internal combustion engine according to claim 1, said chamber having a circumferential wall, said circumferential wall defining a spiral; whereby the distance of this circumferential wall from the longitudinal axis of an outlet valve decreases in said given direction toward and up to an edge defining the terminus of said guide channel.

11. An internal combustion engine according to claim 1 said chamber having a lower edge located at least substantially within a geometrical cylinder defined by the path of said piston.

12. An internal combustion engine according to claim 1, said chamber having an opening adjacent to said piston, said opening being smaller than the maximum crossection of said chamber and being greater than the diameter of said disk of said exhaust valve.

13. An internal combustion engine according to claim 1 said chamber having a height less than its maximum diameter.

14. An internal combustion engine according to claim 1 said chamber having a wall which is at least partly uncooled such that during partial and full-load operation, it acquires operating temperatures of at least 300° C and at most 500°–600° C.

15. An internal combustion engine according to claim 14, wherein said wall is uncooled along its entire circumference.

16. An internal combustion engine according to claim 1, wherein the bottom of said outlet valve, when in its fully opened position, is approximately at a level of largest diameter of said chamber.

17. An internal combustion engine according to claim 1, including a swirl chamber the face of said piston being provided with a depression lying opposite said swirl chamber in said cylinder head, said depression extending said swirl chamber somewhat into said face of said piston when said piston is in its top dead center position.

* * * * *